US012286292B2

(12) United States Patent
Kim

(10) Patent No.: US 12,286,292 B2
(45) Date of Patent: Apr. 29, 2025

(54) TRASH CONTAINER FACILITATING SEALING AND CUTTING OF TRASH BAGS

(71) Applicant: Magikan, Inc., Chungcheongnam-do (KR)

(72) Inventor: Bum Kee Kim, Rancho Cucamonga, CA (US)

(73) Assignee: Magikan, Inc., Asan-Si (KR)

( * ) Notice: Subject to any disclaimer, the term of this patent is extended or adjusted under 35 U.S.C. 154(b) by 0 days.

(21) Appl. No.: 18/033,795

(22) PCT Filed: Oct. 1, 2021

(86) PCT No.: PCT/KR2021/013480
§ 371 (c)(1),
(2) Date: Apr. 25, 2023

(87) PCT Pub. No.: WO2022/092596
PCT Pub. Date: May 5, 2022

(65) Prior Publication Data

US 2023/0331473 A1 Oct. 19, 2023

(30) Foreign Application Priority Data

Oct. 30, 2020 (KR) ........................ 10-2020-0142868

(51) Int. Cl.
*B65F 1/14* (2006.01)
*B65F 1/06* (2006.01)

(52) U.S. Cl.
CPC ................ *B65F 1/14* (2013.01); *B65F 1/062* (2013.01); *B65F 2210/126* (2013.01); *B65F 2210/167* (2013.01)

(58) Field of Classification Search
CPC ...... B65F 1/14; B65F 1/062; B65F 2210/126; B65F 2210/167; B65F 1/1623; B65D 2590/04; B65D 2590/043
See application file for complete search history.

(56) References Cited

U.S. PATENT DOCUMENTS 3,888,406 A * 6/1975 Nippes .................... B65F 1/062 220/495.07
4,742,339 A * 5/1988 Baziuk .................... A47L 21/00 340/568.1
(Continued)

FOREIGN PATENT DOCUMENTS

CN 203345521 12/2013
JP 2000053203 2/2000
(Continued)

OTHER PUBLICATIONS

International Search Report—PCT/KR2021/013480 dated Jan. 3, 2022.

*Primary Examiner* — Kareen K Thomas
(74) *Attorney, Agent, or Firm* — Richard M. Goldberg

(57) ABSTRACT

Provided is a trash container provided with a sealing-and-cutting unit which can cut a refillable trash bag immediately after sealing the opening thereof automatically with tape to thus allow hygienic and convenient sealing and cutting of the trash bag to be discarded, the trash container including: a main body having a top trash opening; a basket provided below the opening and lined with a continuous-type refillable trash bag; and a door for opening and closing the main body.

4 Claims, 6 Drawing Sheets

(56) References Cited

U.S. PATENT DOCUMENTS

| | | | | | |
|---|---|---|---|---|---|
| 4,850,507 | A | * | 7/1989 | Lemongelli | B65F 1/062 220/495.07 |
| 4,873,811 | A | | 10/1989 | Izumitani et al. | |
| 4,941,653 | A | * | 7/1990 | Sterner, Jr. | B65F 1/0053 220/8 |
| 4,955,505 | A | * | 9/1990 | Battaglia | B65F 1/062 206/390 |
| 5,011,026 | A | * | 4/1991 | Hausman | B65F 1/1607 209/675 |
| 5,115,935 | A | * | 5/1992 | Lemongelli | B65F 1/062 220/495.07 |
| 5,183,157 | A | * | 2/1993 | Darden | B65F 1/062 206/390 |
| 5,236,135 | A | * | 8/1993 | Wilson | A61L 2/18 241/606 |
| 5,242,220 | A | * | 9/1993 | Sandreth | B65F 1/004 D34/1 |

FOREIGN PATENT DOCUMENTS

| | | |
|---|---|---|
| KR | 2020120003149 | 5/2012 |
| KR | 20170130127 | 11/2017 |
| KR | 102094524 | 3/2020 |
| KR | 20200107857 | 9/2020 |

* cited by examiner

TRASH CONTAINER FACILITATING SEALING AND CUTTING OF TRASH BAGS

TECHNICAL FIELD

The present disclosure relates to a trash container provided with a sealing-and-cutting unit which can cut a refill bag immediately after sealing the opening of a trash bag automatically with tape to thus allow hygienic and convenient sealing and cutting of the trash bag to be discarded, the trash container including: a main body having a top trash opening; a basket provided below the opening and lined with a continuous-type refill bag; and a door for opening and closing the main body.

BACKGROUND ART

A typical trash can is in the shape of a container that can hold a certain amount of waste and is equipped with a cover for closing the open top.

Recently, trash cans using roll-type continuous refill bags have been provided so that not only garbage can be easily collected, but also the collected garbage can be sanitarily disposed of.

These trash cans are used by placing the opened edge of a continuous-type refill bag over the top rim of a basket, then pushing the bag down inside the basket, and then tying the bottom of the bag. When the bag is filled, the bag is discarded by cutting the top opening thereof, then the bottom of another refill bag is sealed to continue to be used as a trash bag, which has the advantage of conveniently replacing trash bags.

Yet, in the case of conventional trash cans using refill bags as described above, a cutting blade capable of cutting a refill bag is installed inside a trash can. Thus, it is not only inconvenient to take a filled trash bag out of the trash can and cut the bag, but it is also unsanitary because a user has to tie and discard the trash bag filled with garbage him/herself. Moreover, since both the trash bag to be discarded and the refill bag are tied for disposal, a knot shortens the usable length of the bag compared to the actual length, reducing the capacity of a refill bag.

For reference, as an example of related art, there is Korean Utility Model Application Publication No. 20-2012-0003149 "TRASH BIN WITH BUILT-IN ROLL-TYPE PLASTIC BAG".

Meanwhile, Korean Patent No. 10-2094524 is another example of the related art devised to solve the above-mentioned problems.

In this case, a sealing member that cuts and seals continuous-type trash bags for separation and discharge of a trash bag is provided to rotate vertically on a lower cover inside a trash can. In addition, the sealing member includes: an insertion space formed to press in by narrowing an opening side of a trash bag with the bottom thereof sealed and filled with garbage; tape and a tape cover used to seal and cut the opening side of the trash bag; a bag cutter that cuts the lower side of the sealed opening side of the trash bag.

Still, one of the disadvantages of this invention is that it is unsanitary because a user has to tie and seal the trash bag by him/herself after cutting the trash bag filled with garbage. In addition, since the sealing member is provided inside a main body, it is very inconvenient to lay and cut the trash bag filled with garbage inside the cramped main body.

Moreover, the insertion space through which a continuous-type trash bag passes is formed in an "L" shape, which is inconvenient because the user has to turn the direction of pushing the trash bag once for cutting after sealing. Particularly, since the sealing member is installed in the center of the lower cover, it is very difficult to push the trash bag filled with garbage by turning it inside the main body, causing inconvenience in actual use.

Furthermore, since the sealing member is installed inside the main body, the user has to take the trash bag filled with garbage out of the main body, raise the sealing member, and pass the trash bag through the sealing member while putting the opening side of the trash bag back into the main body in order to perform a sealing-and-cutting operation, which is rather cumbersome.

DISCLOSURE

Technical Problem

The present disclosure has been made keeping in mind the problems occurring in the related art.

An objective of the present disclosure is to provide a trash container that allows a trash bag to be discarded more hygienically and conveniently since an opening of the bag is automatically sealed with tape when the bag is cut and discarded, instead of tying the bag filled with garbage by a user him/herself after cutting the bag for disposal.

In addition, an objective of the present disclosure is to provide a trash container that efficiently utilizes the space inside a main body and immediately seals and cuts a trash bag as a sealing-and-cutting unit automatically protrudes outside the main body only when a door of the trash container is opened, while sealing and cutting of the trash bag is done in one direction simultaneously.

Technical Solution

In order to achieve the above mentioned objective, according to an embodiment of the present disclosure, there is provided a trash container including:

a main body having a top trash opening; a basket provided below the opening and lined with a continuous-type refillable trash bag; and a door for opening and closing the main body, wherein on a side wall of the main body, a sealing-and-cutting unit may be provided to cut a lower end of the refill bag while sealing an upper end of a trash bag to be discarded.

The sealing-and-cutting unit may include: a "U"-shaped housing configured to have an insertion path having an upper opening so that a refill bag is narrowed and passed through; a sealing means built into the housing and configured to seal an inlet of a trash bag with tape; and a cutting means provided on an outside of the housing to cut an upper end of a sealing portion sealed with the tape.

The sealing-and-cutting unit may be stored inside the main body when the door is closed, and may protrude out of the main body when the door is opened.

In the trash container according to the present disclosure, the sealing-and-cutting unit may include:

a sealing tape in a roll type rotatably mounted inside the housing;

a tape attachment wheel provided rotatably at a first side of the upper opening of the insertion path and having a plurality of wing portions exposed to the insertion path;

a tape fixing member provided to be rotatable at a second side of the upper opening of the insertion path and exposed to the insertion path so that an end of the sealing tape is attached;

a tape cutting member rotatably provided below the tape attachment wheel, and configured to have a pushing portion exposed to the insertion path and a tape cutting blade appearing in and disappearing from the insertion path;

a tape support member rotatably provided below the tape attachment wheel, and configured to have a pressing portion contacting the pushing portion; and a bag cutter provided below the tape support member and across the insertion path at a position shifted from the insertion path to cut the upper end of the sealing portion sealed with the tape.

Furthermore, in the trash container according to the present disclosure, at a side of a front of the main body, a lower end of the housing may be hinged so that the sealing-and-cutting unit is rotatably provided, and when the door is closed, the sealing-and-cutting unit may rotate to an inside of the main body to be accommodated therein whereas when the door is opened, the sealing-and-cutting unit may rotate upright to an outside of the door, and the insertion path may protrude out of the main body.

In addition, in the trash container according to the present disclosure, the main body may be provided with a fixing end configured to protrude rearward while being formed in a longitudinal direction from a side of the front thereof, and the housing may be provided with a fixing groove into which the fixing end is inserted when the seal-and-cutting unit stands upright.

Advantageous Effects

As described above, according to a trash container of the present disclosure, a sealing-and-cutting unit stored in a main body protrudes out of the main body when a door is opened, making it easier to cut and seal a trash bag. Particularly, since a tape sealing means and a bag cutting means are provided as one sealing-and-cutting unit, a top opening of the trash bag is automatically sealed with tape during cutting of the bag, so that the bag can be discarded more hygienically.

In addition, because the trash container of the present disclosure has a structure in which the sealing-and-cutting unit is stored inside the main body or protrudes out of the door in conjunction with the opening and closing of the door, after opening the door, the trash bag can be taken out of the main body without separate preparation work, and sealed and cut immediately, thereby increasing the convenience of use.

Furthermore, since the sealing and cutting of the trash bag is done in succession in one direction, sealing and cutting of the trash bag is done in one step without the need to change the direction of pushing the bag in two steps, which is very convenient.

DESCRIPTION OF NUMERALS

Figure 1A:
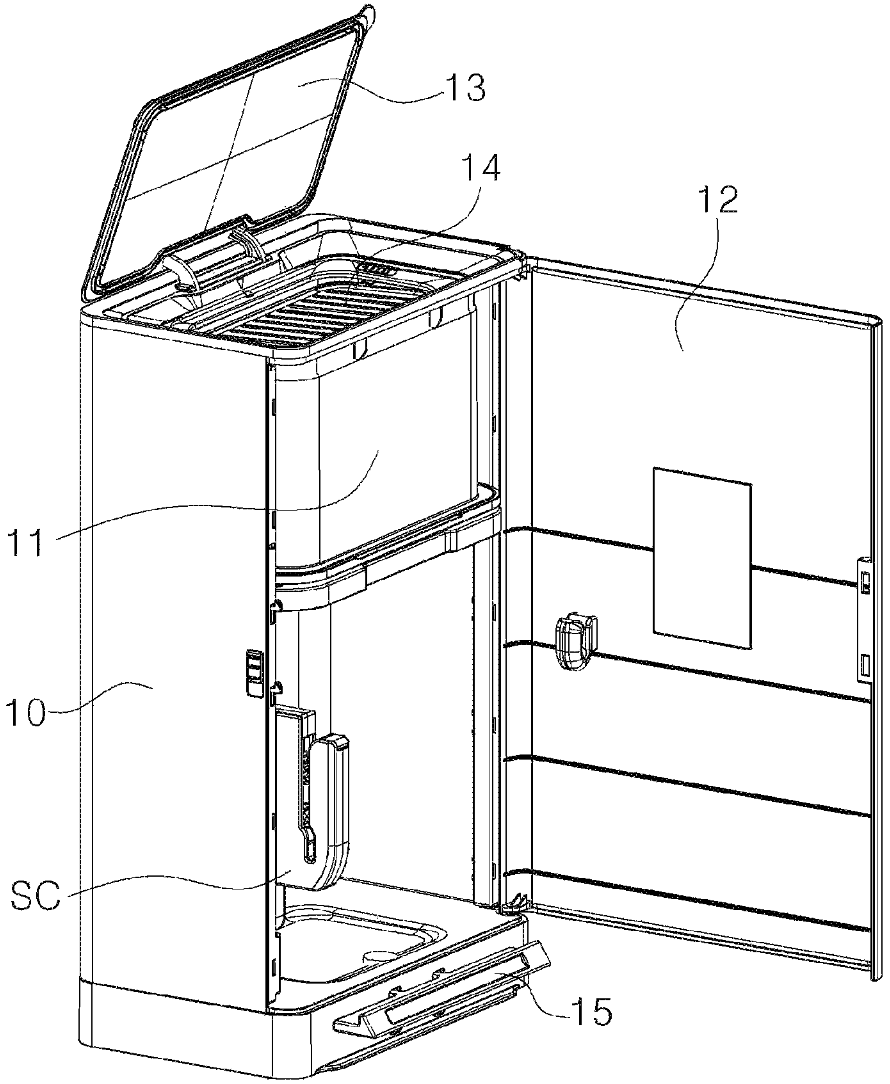
FIGS. 1*a* and 1*b* are external perspective views of a trash can according to the present disclosure.

10: main body SC: sealing-and-cutting unit
20: housing 30: tape attachment wheel
40: tape fixing member 50: tape cutting member
60: tape support member 70: bag cutter

BEST MODE

Since the present disclosure may be made with various changes and may have various forms, aspects (or embodiments) will be described in detail in the text. This, however, is not intended to limit the present disclosure to a specific form disclosed, but should be understood to include all modifications, equivalents or substitutes included in the spirit and scope of the present disclosure.

In each drawing, same reference numerals, particularly reference numerals with the same number of tens and ones digits, or with the same tens and ones digits, and alphabets, indicate members having the same or similar functions. Unless otherwise specified, members indicated by each reference numeral in the drawings may be identified as members conforming to these standards.

Additionally, in each drawing, although components are expressed in exaggeratedly large (or thick) small (or thin) or simplified in size or thickness in consideration of the convenience of understanding, the scope of protection of the present disclosure should not be construed as being limited thereby.

Terms used in this specification are only used to describe specific aspects (or embodiments), and are not intended to limit the present disclosure. Singular expressions include plural expressions unless the context clearly indicates otherwise.

In this application, the terms “comprise”, “provide” or “have” are intended to indicate that there is a feature, number, step, action, component, part, or combination thereof described on the specification, and it is to be understood that the present disclosure does not exclude the possibility of the presence or the addition of one or more other features, numbers, steps, operations, components, parts, or combinations thereof.

Unless otherwise defined, all terms used herein, including technical or scientific terms, have the same meaning as commonly understood by a person skilled in the art. Terms such as those defined in the commonly used dictionaries should be construed as having meanings consistent with the meanings in the context of the related art and shall not be construed in ideal or excessively formal meanings unless expressly defined in this application.

In this application, terms such as “first~”, “second~” are only referred to distinguish different components from each other, regardless of the order in which they are manufactured, and the names may not match in the detailed description of the invention and in the claims.

In describing a trash can according to the present disclosure, for convenience, assuming that a non-rigid approximate direction standard is specified with reference to FIG. 1, the direction in which gravity acts is set to the lower side, and the up, down, left and right directions are determined as they are seen. In the detailed description and claims of the invention related to the other drawings, directions are specified and described according to this criterion unless otherwise specified.

Hereinafter, the trash can according to the present disclosure will be described with reference to the accompanying drawings.

As shown in FIGS. 1 to 5, the present disclosure relates to a trash container including: a main body 10 having a top trash opening; a basket 11 provided below the opening and lined with a continuous-type refill bag; and a door 12 for opening and closing the main body 10.

The trash container includes a sealing-and-cutting unit SC provided on one side wall of the main body 10 and configured to cut the lower end of the refill bag while sealing the upper end of a trash bag to be discarded.

The sealing-and-cutting unit SC includes: a "U"-shaped housing 20 having an insertion path 21 having an upper opening so that a refill bag is narrowed and passed through; a sealing means built into the housing 20 and sealing an inlet of the trash bag with tape T; and a cutting means provided on the outside of the housing 20 to cut the upper end of a sealing portion sealed with the tape T.

The sealing-and-cutting unit SC is stored inside the main body 10 when the door 12 is closed, and protrudes out of the main body 10 when the door 12 is opened.

Figure 1B:
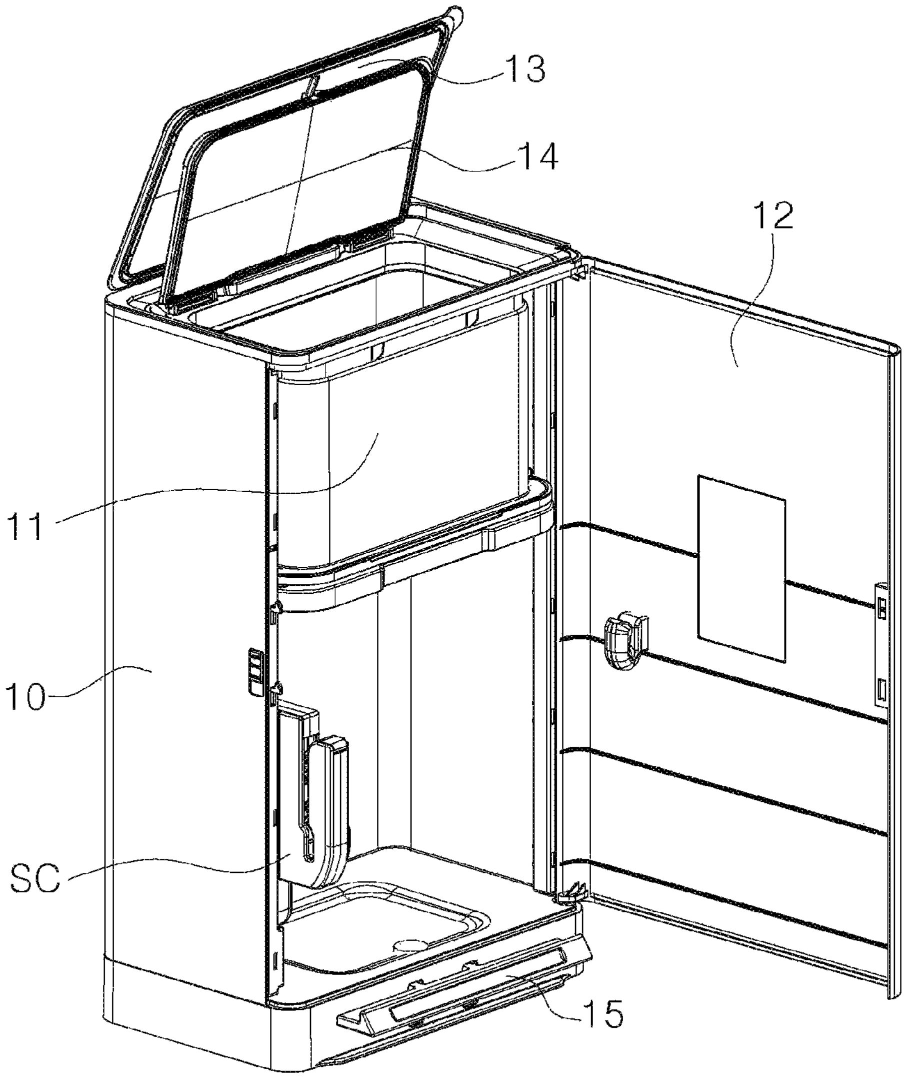
Figure 2:
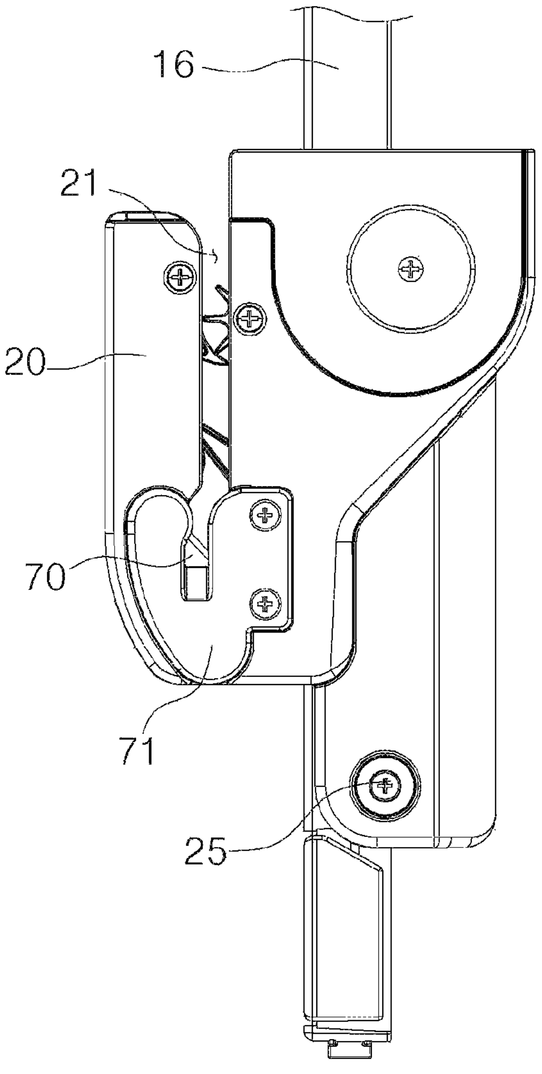
FIG. 2 is a right side view of the external appearance of a sealing-and-cutting unit according to the present disclosure.

To be specific, as shown in FIG. 1*a*, the main body 10 has a cover for opening and closing the top opening, and in FIG. 1B, a double cover structure is shown. The front end of an inner cover 14 is connected to an outer cover 13, which is automatically opened and closed by the operation of a footrest 15, so that the inner and outer covers are opened and closed together.

In the main body 10, the basket 11 having upper and lower surfaces opened so as to be lined with a refill bag is detachably provided below the top opening, and a waste storage unit in which refillable trash bags are mounted is formed below the basket 11.

The door 12 is hinged to the main body 10 to be opened and closed in a casement manner, and the sealing-and-cutting unit SC is provided at a corner portion opposite to a hinge portion of the door 12.

In addition, the housing 20 of the sealing-and-cutting unit SC has a "U"-shaped structure, and since the insertion path 21 has a straight structure, the passage of a trash bag is made in one direction and cutting after sealing may be performed continuously.

To be specific, the sealing-and-cutting unit SC includes:

- a sealing tape T in a roll type rotatably mounted inside the housing 20;
- a tape attachment wheel 30 provided rotatably at one side of the upper opening of the insertion path 21 and having a plurality of wing portions 31 exposed to the insertion path 21;
- a tape fixing member 40 provided to be rotatable at the other side of the upper opening of the insertion path 21 and exposed to the insertion path 21 so that the end of the sealing tape T is attached;
- a tape cutting member 50 rotatably provided below the tape attachment wheel, and configured to have a pushing portion 51 exposed to the insertion path 21, and a tape cutting blade 52 appearing in and disappearing from the insertion path 21;
- a tape support member 60 rotatably provided below the fixing member 40, and configured to have pushing portion 51 contacting the pushing portion 51 while being exposed to the insertion path 21; and
- a bag cutter 70 provided below the tape support member 60 and across the insertion path 21 at a position shifted from the insertion path 21 to cut the upper end of the sealing portion sealed with the tape T.

The sealing tape T is wound around a roller R rotatably coupled inside the housing 20, and the end of the sealing tape T is guided by the tape attachment wheel 30 and is attached to and fixed to the inner surface of the tape fixing member 40.

The tape attachment wheel 30 has the wing portions 31 protruding in the shape of a waterwheel, and the wing portions 31 are provided to rotate downwardly toward the front.

The tape attachment wheel 30 guides the sealing tape T released from the roller R to the lower portion of the insertion path 21 and, at the same time, inserts and gathers a refill bag into the space between the wing portions 31.

The tape fixing member 40 is a streamlined member whose rear surface is concavely curved toward the front while one side end is connected downwardly inclined toward the rear where the insertion path 21 is located from a pivot shaft. The wing portions 31 are provided to be in contact with a curved rear surface 41 of the tape fixing member 40, and an extension spring 42 is connected to the other end of the tape fixing member 40 so that the tape fixing member 40 is elastically supported to rotate upward toward the rear.

In the tape cutting member 50, the pushing portion 51 protrudes obliquely toward the lower front side, and the tape cutting blade 52 is horizontally positioned on a mounting portion 53 protruding at an angle of about 90 to 100 degrees toward the rear side of the pushing portion 51.

In the tape cutting member 50, an extension spring 54 is connected to the mounting portion 53 so that the pushing portion 51 is elastically supported so as to rotate upward toward the front, and thus when no external force is applied, the tape cutting blade 52 is accommodated inside the housing 20 in a state where the pushing portion 51 is exposed on the insertion path 21.

In the tape support member 60, the pressing portion 61 is connected obliquely toward the rear upper side and is in contact with the lower surface of the pushing portion 51, and at this time, the rear surface of the pressing portion 61 is convex backward, so that when the pushing portion 51 rotates downward, the pressing portion 61 is pressed to rotate upward toward the front.

In the tape support member 60, the front of the pressing portion 61 is connected to a compression spring 62 and is elastically supported to rotate downward toward the rear.

At this time, the housing 20 has guide portions 22 and 23 protruding vertically apart from one side wall, and the compression spring 62 is provided between the guide portions 22 and 23.

In addition, the upper guide portion 22 is formed longer so that the rear end thereof is located on the rear side than the lower guide portion 23, and the pressing portion 61 is provided with a passage groove 63 through which the upper guide portion 22 passes.

Due to this, the pressing portion 61 rotating in an arc shape may be safely elastically supported by the straight compression spring 62. At this time, the passage groove 63 enables the rotation of the pressing portion 61, and the lower guide portion 23 limits the angle at which the pressing portion 61 rotates.

Figure 3:
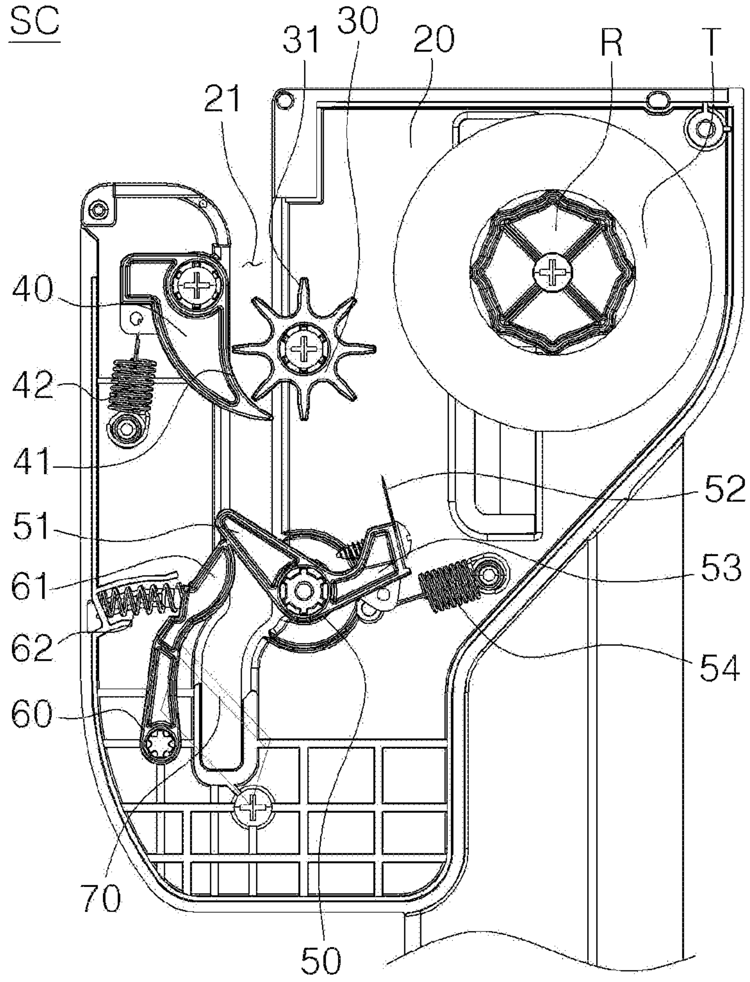
FIG. 3 is a right side view showing the internal structure of the sealing-and-cutting unit according to the present disclosure.
Figure 4:
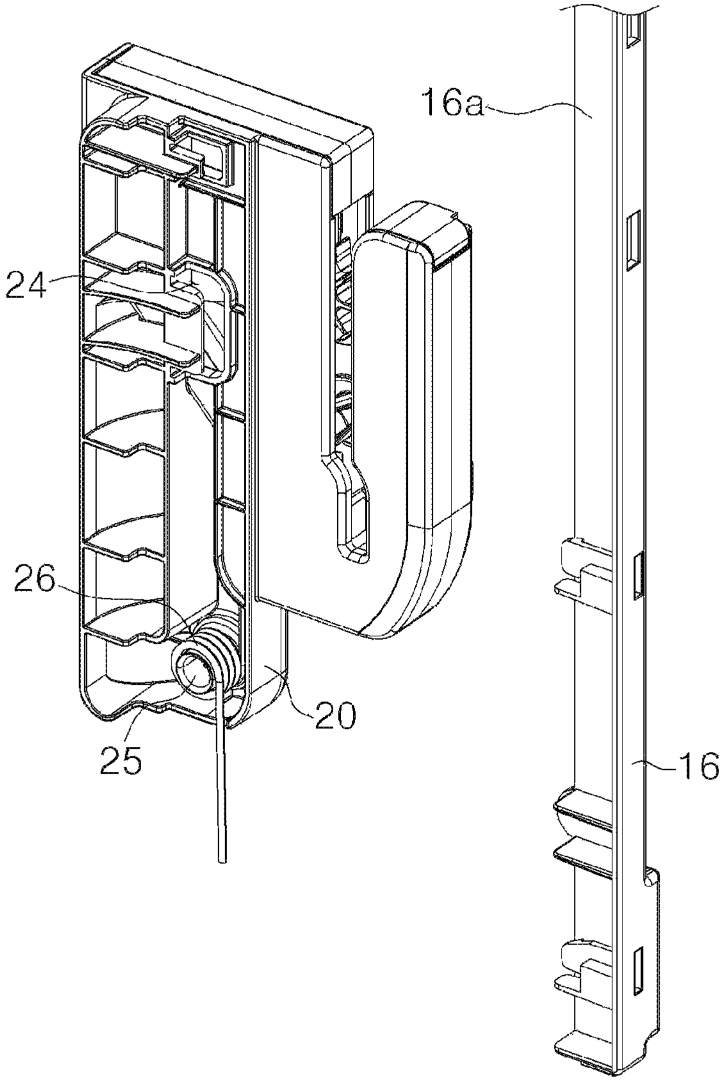
FIG. 4 is a perspective view showing the coupling structure of the sealing-and-cutting unit according to the present disclosure.
Figure 5:
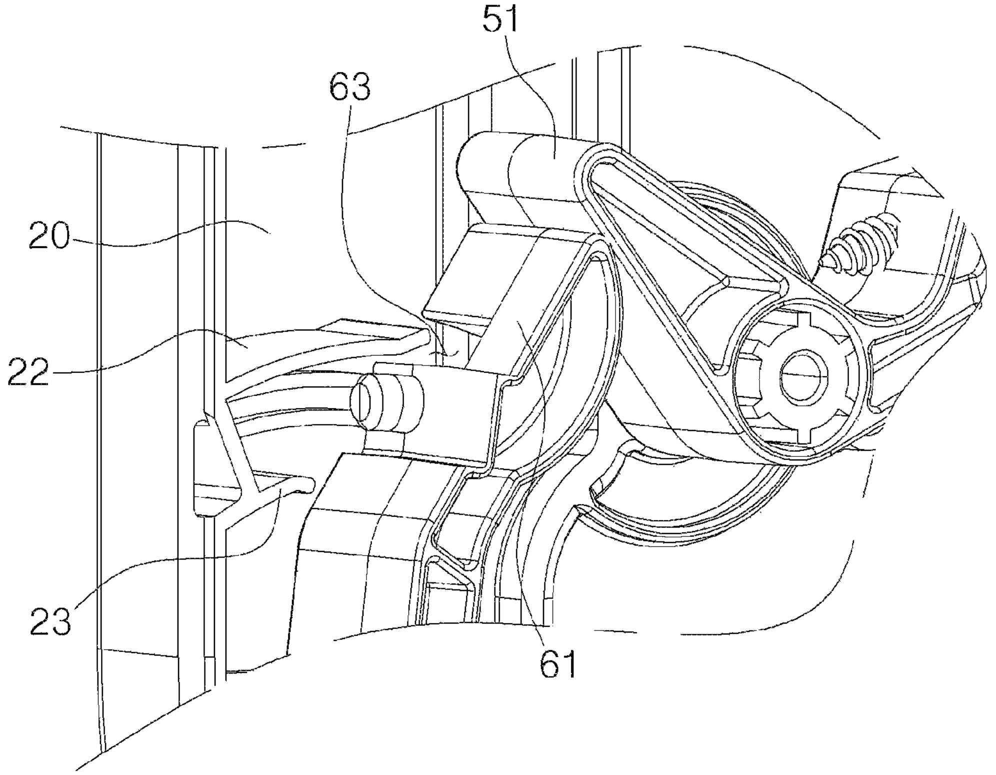
FIG. 5 is an enlarged perspective view of the main part of the sealing-and-cutting unit according to the present disclosure.

The bag cutter 70 is built into a cover 71 coupled to the outer surface of the other side of the housing 20, and is installed vertically upright in front and back (In FIG. 3, a blade of the bag cutter 70 is shown transparently for convenience of understanding).

That is, the blade of the bag cutter 70 is not located on the same line up and down with the insertion path 21, but is provided at a position spaced apart from the insertion path by a predetermined distance in the left and right direction of the insertion path 21 (right side in the drawing).

Meanwhile, in the present disclosure, at one side of the front of the main body 10, the lower end of the housing 20 is hinged so that the sealing-and-cutting unit SC is rotatably provided. When the door 12 is closed, the sealing-and-cutting unit SC is laid inside and stored in the main body 10 whereas when the door 12 is opened, the sealing-and-cutting unit SC stands upright and the insertion path 21 protrudes out of the main body 10.

In the housing 20, a pin spring 26 is coupled to a hinge portion 25 so that the seal-and-cutting unit SC is elastically supported to rotate upward toward the front of the main body 10.

In the present disclosure, at one side of the front of the main body 10, the lower end of the housing 20 is hinged so that the sealing-and-cutting unit SC is rotatably provided. When the door 12 is closed, the sealing-and-cutting unit SC rotates to the inside of the main body 10 to be accommodated therein whereas when the door 12 is opened, the sealing-and-cutting unit SC rotates upright to the outside of the door, so that the insertion path 21 protrudes out of the main body 10.

As such, when the sealing-and-cutting unit SC of a certain size is stored inside the main body 10, the space occupied by the waste storage unit may be minimized, and since the insertion path 21 through which a refillable trash bag passes is protruded forward and upright of the main body 10, a user can more easily seal and cut the trash bag by simply pushing the trash bag downward to be inserted.

In addition, the main body 10 includes a fixing end 16*a* protruding rearward while being formed in the longitudinal direction from one side of the front thereof, and the housing 20 includes a fixing groove 24 into which the fixing end 16*a* is inserted when the seal-and-cutting unit SC stands upright.

The fixing end 16*a* is provided on a front corner frame 16 to which one side wall of the main body 10 is coupled, and a plurality of the fixing groove 24 are provided on the outer side of one side of the housing 20 at a predetermined interval in the vertical direction.

The reason for introducing the fixing end 16*a* and the fixing groove 24 is to make the housing 20 stop and fix in place when the sealing-and-cutting unit SC automatically rotates to protrude toward the front of the main body 10 upon the opening of the door 12, and to prevent the left and right movement of the housing 20 by means of the fixing end 16*a* to protect the sealing-and-cutting unit from being broken and damaged in the main body 10 since a part of the housing 20 (that is, the insertion path 21) protrudes forward of the main body 10, and the hinge portion 25 of the housing 20 is easily damaged by left and right impact.

The garbage discharge process using the trash container of the above configuration will be described.

First, when the door 12 is opened to discharge the garbage, the sealing-and-cutting unit SC automatically protrudes forward from the main body 10 and the insertion path 21 is erected vertically without a separate preparation work.

Then, a user pulls the trash bag to be discharged to release a refill bag, and then pushes the inlet side of the trash bag into the insertion path 21.

The trash bag inserted into the insertion path 21 is closed up and inserted into the space between the wing portions 31 while pushing the sealing tape T, and at this time, the sealing tape T released as the tape attachment wheel 30 rotates is attached to while wrapping the outer surface of the trash bag.

The sealing portion of the trash bag pushes the tape support member 60 while passing between the tape attachment wheel 30 and the tape support member 60, and after the trash bag passes, the tape support member 60 returns to its original state while pushing the sealing tape T so that the sealing tape T is completely attached to the outer surface of the trash bag.

Then, the sealing portion of the trash bag pushes the pushing portion 51 so that the tape cutting blade 52 is drawn toward the insertion path 21, and at this time, the pressing portion 61 is pushed by the pushing portion 51 and pushed into the housing 20.

In addition, when the sealing portion of the trash bag passes the pressing portion 61, as the external force caused by the pushing portion 51 is removed, the pressing portion 61 returns to its original state toward the insertion path, and the rear end of the sealing tape T is pushed backward and pulled tight. At this time, as the tape cutting blade 52 passes the sealing tape T, the tape T is horizontally cut.

In this state, the sealing portion of the trash bag in which the tape T is cut passes through the bag cutter 70. At this time, the bag cutter 70 is provided to cross the insertion path 21 at an offset position, so that the upper end of the sealing portion of the trash bag is cut by the bag cutter 70.

Accordingly, the inlet of the trash bag to be discarded is automatically sealed by the tape T during the cutting operation, and the user may dispose of the garbage hygienically by immediately discharging the garbage without tying the trash bag, and the cut refill bag may be reused as a trash bag by tying the bottom of the refill bag as it is before.

According to the present disclosure described above, sealing and cutting are performed by handling the trash bag in a wide space outside the main body 10, and sealing and cutting are performed continuously only by pushing the trash bag in one direction, which is very convenient. Furthermore, when the sealing-and-cutting unit is not used, the SC space inside the main body 10 may be efficiently utilized.

In the above description of the present disclosure, the trash container has been mainly described with reference to the accompanying drawings. However, the present disclosure may be variously modified, changed, and substituted by those skilled in the art, and such modifications, changes and substitutions should be construed as belonging to the protection scope of the present disclosure.

The invention claimed is:

1. A trash container comprising:

a main body configured to have a top trash opening;

a basket provided below the opening and lined with a continuous refill bag; and a door for opening and closing the main body, wherein on a side wall of the main body, a sealing-and-cutting unit is provided to cut a lower end of the refill bag while sealing an upper end of a trash bag to be discarded, wherein the sealing-and-cutting unit comprises:

a "U"-shaped housing configured to have an insertion path having an upper opening so that a refill bag is narrowed and passed through;

a sealing means built into the housing and configured to seal an inlet of a trash bag with tape; and a cutting means provided on an outside of the housing to cut an upper end of a sealing portion sealed with the tape, and the sealing-and-cutting unit is stored inside the main body when the door is closed, and protrudes out of the main body when the door is opened.

2. The trash container of claim 1, wherein the sealing-and-cutting unit comprises:

a sealing tape in a roll type rotatably mounted inside the housing;

a tape attachment wheel provided rotatably at a first side of the upper opening of the insertion path and having a plurality of wing portions exposed to the insertion path;

a tape fixing member provided to be rotatable at a second side of the upper opening of the insertion path and exposed to the insertion path so that an end of the sealing tape is attached;

a tape cutting member rotatably provided below the tape attachment wheel, and configured to have a pushing portion exposed to the insertion path and a tape cutting blade appearing in and disappearing from the insertion path;

a tape support member rotatably provided below the tape attachment wheel, and configured to have a pressing portion contacting the pushing portion; and a bag cutter provided below the tape support member and across the insertion path at a position shifted from the insertion path to cut the upper end of the sealing portion sealed with the tape.

3. The trash container of claim 1, wherein at a side of a front of the main body, a lower end of the housing is hinged so that the sealing-and-cutting unit is rotatably provided, and when the door is closed, the sealing-and-cutting unit rotates to an inside of the main body to be accommodated therein whereas when the door is opened, the sealing-and-cutting unit rotates upright to an outside of the door, and the insertion path protrudes out of the main body.

4. The trash container of claim 3, wherein the main body is provided with a fixing end configured to protrude rearward while being formed in a longitudinal direction from a side of the front thereof, and the housing is provided with a fixing groove into which the fixing end is inserted when the seal-and-cutting unit stands upright.

* * * * *